United States Patent [19]

Kolibas et al.

[11] Patent Number: 4,627,465

[45] Date of Patent: Dec. 9, 1986

[54] COLOR CHANGER

[75] Inventors: James A. Kolibas, Broadview Heights; William P. Mueller, Elyria, both of Ohio

[73] Assignee: Nordson Corporation, Amherst, Ohio

[21] Appl. No.: 829,444

[22] Filed: Feb. 13, 1986

Related U.S. Application Data

[63] Continuation of Ser. No. 680,134, Dec. 10, 1984, abandoned.

[51] Int. Cl.[4] .................. F16K 11/00

[52] U.S. Cl. .................. 137/563; 137/881; 137/879; 137/884; 137/885; 239/125

[58] Field of Search .................. 137/563, 879, 881, 883, 137/884, 885; 239/124, 125, 137

[56] References Cited

U.S. PATENT DOCUMENTS 2,257,004 9/1981 Fleming .
2,776,182 1/1957 Gunderson .
3,145,930 8/1964 Herklotz et al. .
3,176,922 4/1965 Decker .
3,240,225 3/1966 Barrows .
3,310,204 3/1967 Zinman et al. .
3,348,774 10/1967 Wiggins .................. 239/124 X
3,373,762 3/1968 Korchak .
3,403,695 10/1968 Hopkins .................. 137/883 X
3,443,578 5/1969 Hedin .
3,458,133 7/1969 Wiggins .................. 239/124 X
3,477,870 11/1969 Boretti et al. .
3,504,855 4/1970 Volker .
3,558,051 1/1971 Strickler .
3,572,366 3/1971 Wiggins .................. 137/563 X
3,598,322 8/1971 Rupert et al. .
3,672,570 6/1972 Scarbrough et al. .
3,716,191 2/1973 Knight .
3,857,513 12/1974 Wiggins .
3,870,233 3/1975 Wilhelm et al. .
3,924,810 12/1975 Otterstetter .
3,939,855 2/1976 Wiggins .
4,083,493 4/1978 Wiggins .
4,106,699 8/1978 Holt .................. 239/124
4,163,523 8/1979 Vincent .
4,215,721 8/1980 Hetherington et al. .
4,231,392 11/1980 Allibert .................. 137/606 X
4,248,379 2/1981 Hollstein et al. .
4,265,858 5/1981 Crum et al. .
4,337,282 6/1982 Springer .
4,403,736 9/1983 Scharfenberger .
4,489,758 12/1984 Malary et al. .................. 137/883 X
4,497,341 2/1985 Wright .................. 137/563

FOREIGN PATENT DOCUMENTS 2747707 10/1977 Fed. Rep. of Germany .
7603543 2/1976 France .
713594 2/1980 U.S.S.R. .

OTHER PUBLICATIONS

Research Disclosure No. 188, Dec. 1979.

*Primary Examiner*—A. Michael Chambers
*Assistant Examiner*—John C. Fox
*Attorney, Agent, or Firm*—Wood, Herron & Evans

[57] ABSTRACT

A modular color changer provides selected paint colors for spraying and continuously recirculates both selected and non-selected colors. A module is provided for each color to be selected and includes supply and return manifold blocks defining, respectively, portions of a respective universal supply manifold and of respective universal return manifold. Port control valves are utilized to control paint flow therethrough, under normal supply pressures. Solvent and air purge valves are used for cleaning. The changer is particularly advantageous when used in high pressure spraying systems. Modules can easily be added to a basic changer to increase the number of selectable paints.

23 Claims, 5 Drawing Figures

COLOR CHANGER

This is a continuation, of application Ser. No. 680,134, filed Dec. 10, 1984, now abandoned.

This invention relates to color changers and more particularly to apparatus for selectively providing paint of various colors to paint applicator apparatus.

Attention is directed to applicants' related co-pending patent application, Ser. No. 680,351, entitled "Circulating Color Changer with Improved Valve and Manifold," filed on even date herewith, James Kolibas, inventor.

There have been numerous color changer devices for controlling the alternative delivery of paint of selected colors to spraying apparatus, stopping of non-selected colors, and cleaning of the system between color selection operation. Various kinds of color changers today in use, however, have certain inherent disadvantages.

Such disadvantages are frequently the result of specific parameters or characteristics of the particular paint to be used, such as the paint's viscosity or its solids content. For example, in many painting systems, heat is required to reduce the viscosity of otherwise heavy or thick paint to a point where is can be more easily sprayed.

Where heat is utilized, it is known to apply heat to the paint at specific locations in the system. If paint flow is stopped for any significant time, paint at the heat location may be overheated, and charred, or otherwise damaged. Likewise, paint remote from the heaters cools. This affects the paint's viscosity and thereby causes variations in paint atomization and finish.

Some paints, such as the metallics, for example, may include solids which should be maintained in uniform suspension throughout the supply and piping system during any application operation.

The same stoppage of paint flow for any significant time may let solids within the paint settle out of the desired suspension, producing a non-uniform coating in sprayed paint and electrostatic grounding problems.

Known color changers for high pressure systems operating at ranges exceeding 1000 psi, for example, are generally referred to as dead-end, or non-circulating to gun, changers. Paint is generally conveyed to the applicator gun, moving through a system including a color changer manifold. However, when the gun or applicator is shut down, or the particular paint color is not being selected, paint flow is stopped between the changer manifold and the gun with paint circulating between the paint supply and manifold only. The paint which is dead ended between the manifold and gun can cool. Even where there are no temperature gradients, for example, solids can settle out of suspension. Thus, in a heavy or viscous metallic paint, for example, paint in such known system may be subjected to both undesirable cooling and settling. Prior recirculating changers for low pressure systems operating in the range of 80 to 200 psi, for example, utilized bellows devices for separating and sealing paint from elements of the paint valve actuators. Such bellows rupture and break, however, if used in a high pressure system at 1000 psi and above, for example.

Accordingly, it has been one objective of the invention to provide an improved color changer.

A further objective of the invention has been to provide an improved color changer which prevents paint overheating, temperature gradients, or solids from settling out of suspension for both the paint selected and the paint of non-selected colors.

Another objective of the invention has been to provide an improved color changer having apparatus facilitating the addition or removal of any number of specific colors to be changed.

A further objective of the invention has been to provide a fully recirculating color changer for a high pressure paint applying system.

To these ends, an improved color changer according to a preferred embodiment of the invention preferably includes a plurality of identical changer modules, one module for each color of paint to be selected, and providing for full recirculation of paint of all non-selected colors, and a continuous recirculation return to supply of excess paint of a selected color during a spraying operation in a high pressure painting system.

The changer includes a universal applicator supply manifold and a universal applicator return manifold, defined respectively by interconnected bores in a plurality of module supply and return blocks. Each module also includes a recirculation block defining a recirculation passageway.

A normally closed supply valve, in each module, passes paint of a non-selected color to a normally closed, but pneumatically opened recirculation valve on the recirculation block. Paint is thus passed back to its supply through the recirculation passage. When paint of this color is selected, the supply valve is pneumatically opened, the recirculation valve closed, and paint is conveyed to the supply manifold block of that module, and thus to the universal supply manifold, the spray guns, and the universal return manifold. From the return manifold, the paint flows to the return manifold block of the module and to a normally closed, but now opened, return valve. The return valve is mounted to the recirculation block and passes paint to the common recirculation passage and back to the supply.

Each module thus preferably includes a supply manifold block, a return manifold block, a recirculation block and pneumatic piston controlled supply, recirculation and return valves connected respectively thereto, as noted, for supplying and receiving a selected paint of one color to and from universal manifolds and the supply, for recirculating paint of the one color to the supply when that color paint is not selected, and for recirculating unused paint of the one color when the one color is selected.

No bellows are used in the respective valves, and thus the changer is particularly useful for high pressure airless spraying.

One module is provided for each paint color, and each module is provided with bores and sealable porting so it can be easily stacked and secured by screws to an adjacent module. In order to increase the number of colors a basic color changer according to the invention can handle, it is only necessary to add modules to the basic changer. For example, it is easy to increase the number of colors a basic twocolor changer can handle merely by stacking the same number of add-on modules required for the number of colors to be added.

The assembly of modules is easily accomplished, with each module including and defining its own portion of the universal supply and return manifolds. No additional piping or connections, except lines to and from the additional color supply, and to and from the valve control solenoid, are required.

Moreover, the full recirculating capabilities noted above are retained without long or significant stagnant areas for any paint during a painting operation. Also, areas of non-flow, such as between the supply and recirculation valves of a selected module when the paint of that module is being sprayed, are eventually recirculated through the supply and system before further application where it is homogenized as to heat and mixture.

Due to the interconnection of the manifold blocks, pressure drop through the system is not significantly increased as it might be if each additional color required further piping between the manifold portions of each module or paint valve ports.

In addition, and according to the invention, separate solvent and air modules are provided for cleaning the color changer between color changes. The solvent and air modules are disposed upstream in the universal supply manifold. The dump valve is disposed downstream in the universal return manifold, to provide for entire system cleaning between color changes. These modules do not require recirculation valves or recirculation blocks as the used solvent is simply piped to the dump valve, and the air is also vented or piped to the dump valve.

Accordingly, the color changer of the invention can be particularly effective with high pressure airless systems. Where the changer is used in high pressure systems, the valves may be provided with additional springing to help the valve close when high pressure flow may otherwise tend to keep it open.

The invention thus provides a recirculating color changer wherein paint of all non-selected colors is continually recirculated, and excess paint of a selected color is also returned to supply.

Add-on modules define their own portions of universal supply and return manifolds, and can easily be added to a basic changer to handle additional colors, while retaining the full recirculation advantages described above in a high pressure spraying system.

These and other objectives and advantages will become readily apparent from the following detailed description of a preferred embodiment of the invention and from the drawings in which.

Figure 1:
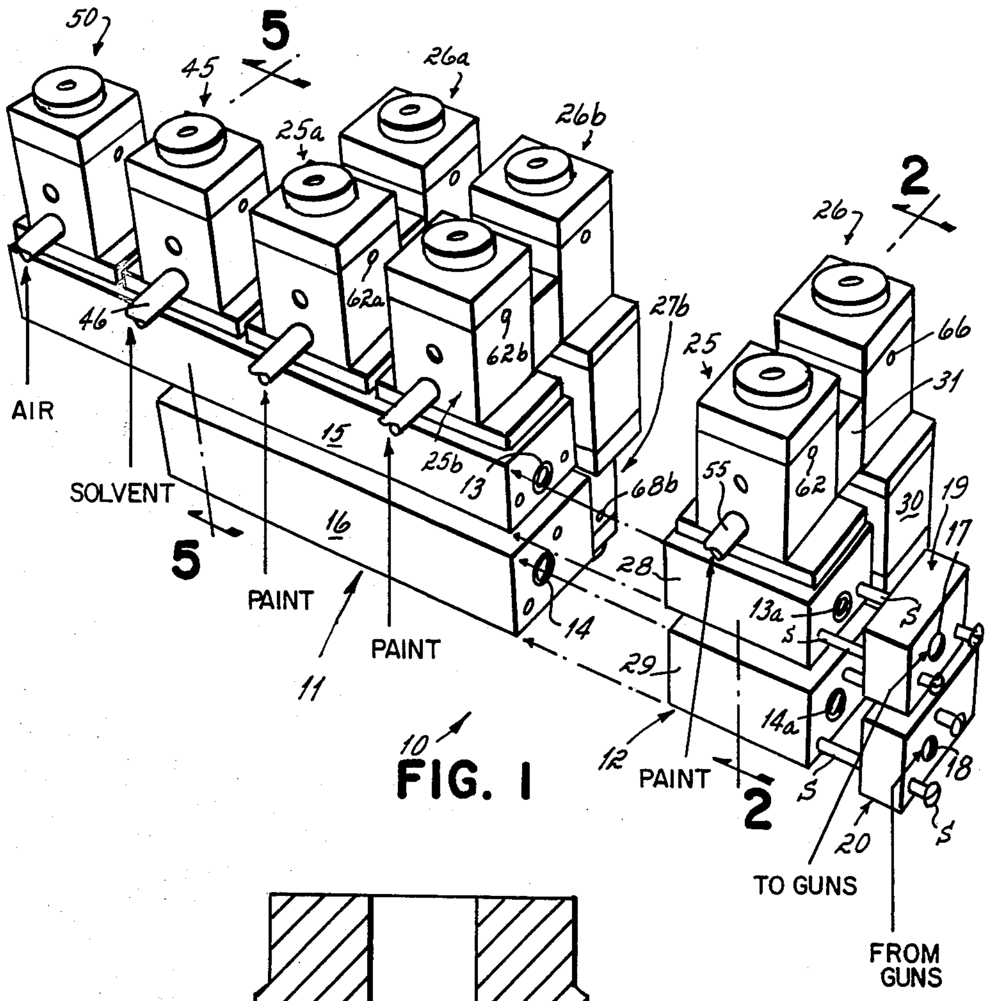
FIG. 1 is a diagrammatic, exploded, perspective view showing a three-color color changer according to the invention.

Turning now to the drawings, there is shown in FIG. 1 thereof a color changer 10 according to a preferred embodiment of the invention. It will be appreciated that color changer 10 is particularly adapted for utilization in painting systems which are utilized to apply more than one particular color to an object. Multiple-color painting systems are utilized in many varied applications.

It is frequently desirable to apply paint of different types within an application system, such as normal paint of one or more given colors and other paints having solids therein, such as metallic paints, for example.

It will be appreciated that the color changer 10, as described herein, is useful in a variety of varying types of painting systems where it is desired to utilize more than one color or type of paint for application by a particular applying apparatus, such as an electrostatic paint spraying gun or other form of applicator.

It will also be appreciated that color changers are utilized in high pressure systems, that is, on the order of about 1000 psi and above, such as 2000 to 3000 psi.

As shown in the drawings, color changer 10 includes what will be referred to as a basic two-color color changer 11 and an additional color module means 12 added to the basic two-color changer 11, so as to form a three-color color changer 10 as shown in FIG. 1. The color module 12 is shown in exploded form from the basic color changer 11 for illustrative purposes only and it will be appreciated that in use, the color module 12 is connected to and operatively associated with the basic color changer 11 to form the integral color changer 10.

Also it will be appreciated that normally color changers are utilized where two or more different colors or different types of paints or fluids are to be utilized within the system. Accordingly, the basic color changer 11 is provided with means for selecting between two different colors or types of paints and it will be appreciated that additional color modules, such as the module 12, can be added to make a multiple-color color changer to provide a color changer having the capacity for selecting between three or more different colors or types of paints or fluids to be handled by the system. Basic color changer 11 can thus be made in a unitary construction, or can be assembled from modules such as module 12, and appropriate solvent and air purge and dump valve components.

Referring now to more of the details of the color changer as shown in FIG. 1, it will be appreciated that the color changer 10 includes a universal paint supply manifold 13 and a universal paint return manifold 14. As shown in FIG. 1, the manifolds 13 and 14 are defined by machined aluminum blocks, such as at 15 and 16. As shown in FIG. 1, the blocks 15 and 16 are integral and extend throughout the basic two-color color changer 11. It will be appreciated that the blocks 15 and 16 could be manufactured in separate assemblies, one block for each color, as will be described with respect to the color module 12.

It will be further appreciated that the manifolds 13 and 14, respectively, eventually terminate at ports 17 and 18, located in terminal blocks 19 and 20, respectively, for connection to appropriate conduits leading to and from appropriate paint spraying guns, for example. Terminal blocks 19 and 20 are used at the end of changer 10 for this purpose regardless of the number of modules used in the changer.

Figure 2:
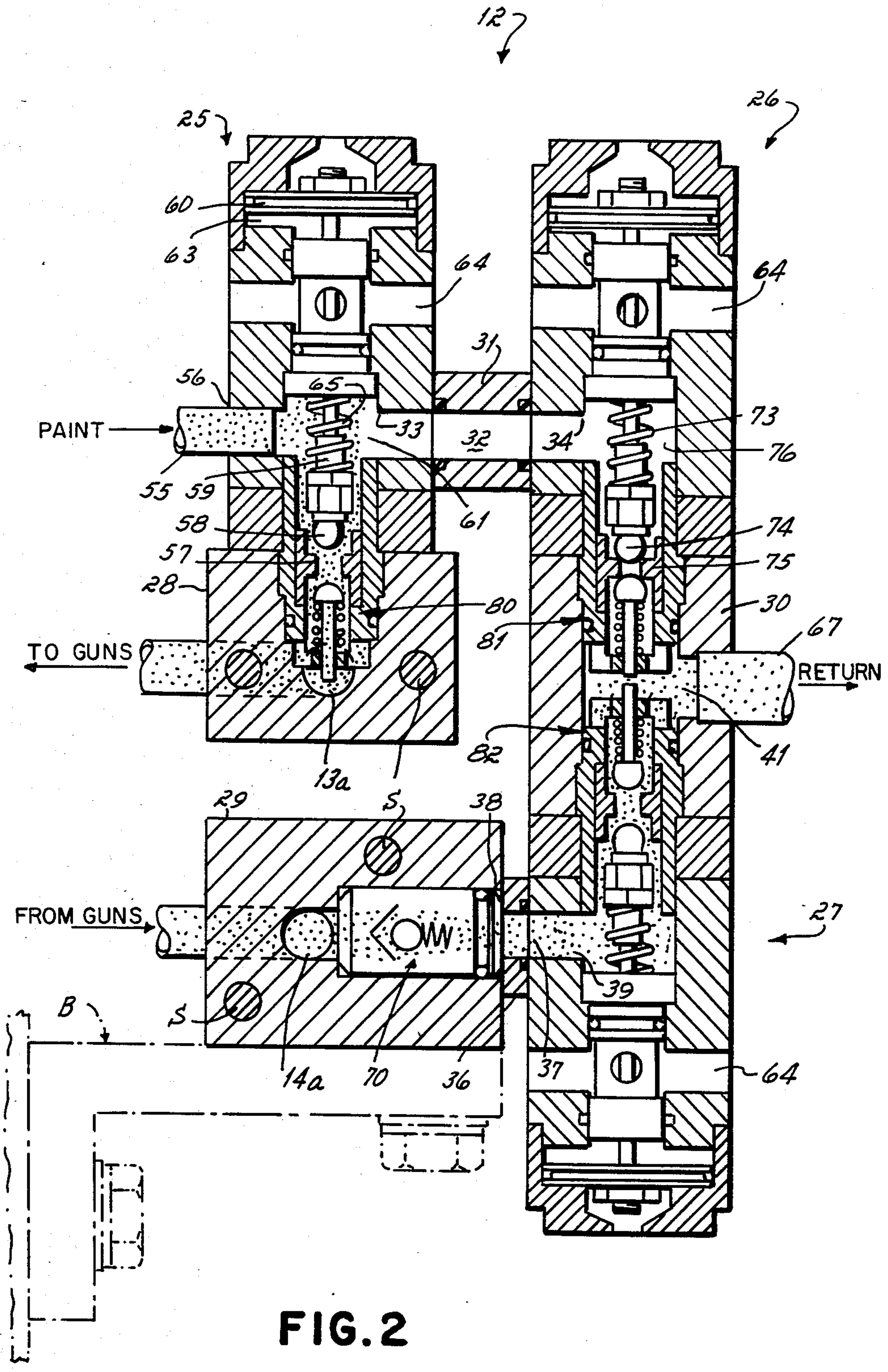
FIG. 2 is a cross-sectional view of a single color module taken along lines 2—2 of FIG. 1, and showing a paint flow path for a selected color, the dots or stippling indicating paint flow.
Figure 3:
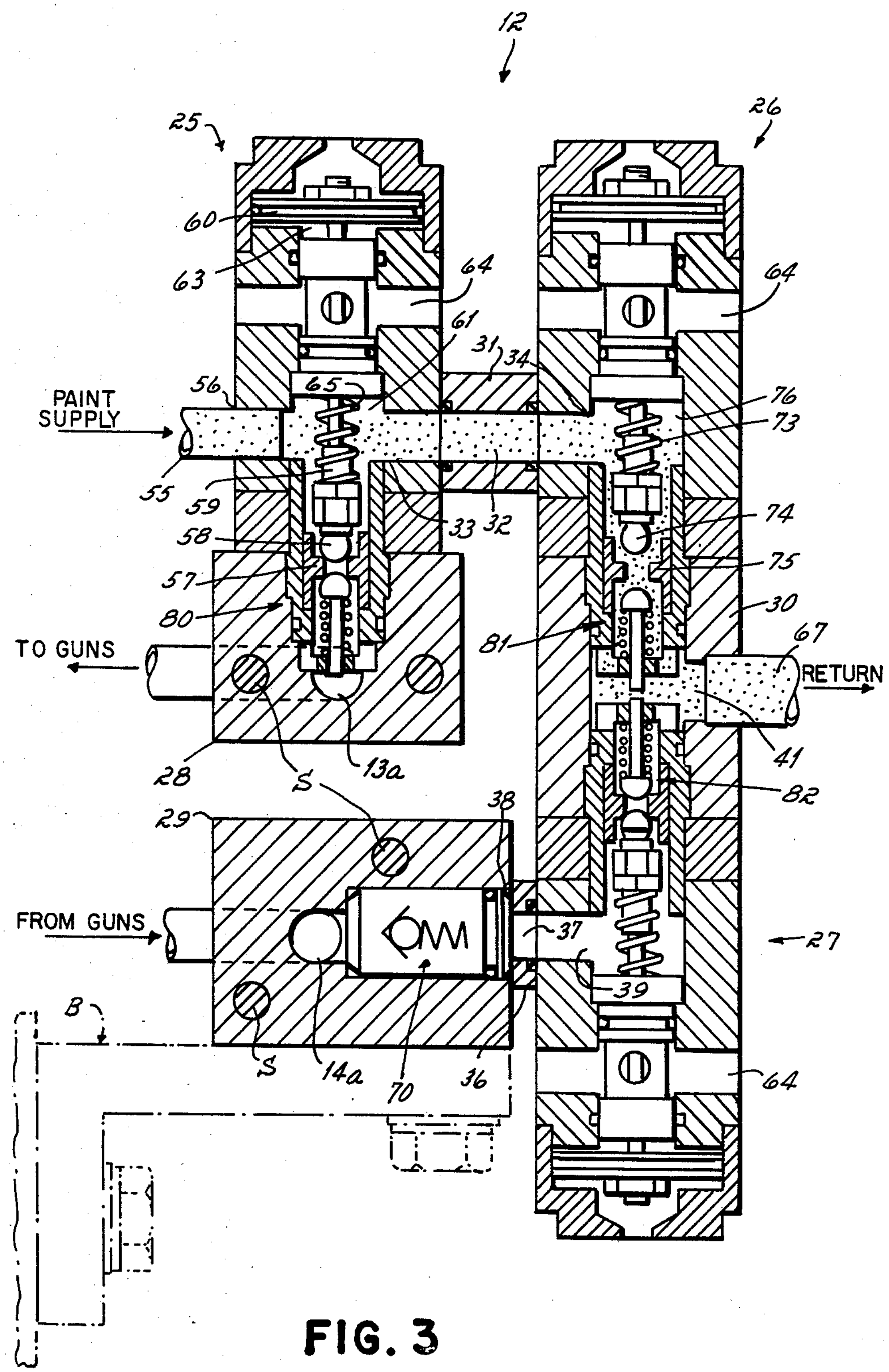
FIG. 3 is a diagrammatic cross-sectional view similar to FIG. 2, but showing a paint flow path when the paint color of the module is not selected, the dots or stippling indicating paint flow.

Considering the color module 12, it will be appreciated that this module includes a paint supply valve 25, a recirculation valve 26 and a paint return valve 27, not particularly shown in FIG. 1 but more readily seen in FIGS. 2 and 3. The module 12 also includes a supply manifold block 28, a return manifold block 29 and a recirculation block 30. Supply valve 25 and recirculation valve 26 are connected together by means of a connecting block 31 disposed therebetween and containing a bore 32 therethrough, operatively connecting a constantly open output port 33 in valve 25 to a constantly open input port 34 in the valve 26. In similar fashion, a connecting block 36 is mounted and extends between the return manifold block 29 and the return valve 27. Block 36 includes a bore 37 therethrough, interconnecting an output port 38 of the manifold block 29 with an input port 39 of the return valve 27.

It will also be appreciated that the respective recirculation valve 26 and return valve 27 are both operatively mounted on the recirculation block 30 which defines a common recirculation passageway 41 therein.

It will also be appreciated, particularly from viewing FIGS. 1 and 2, that the supply manifold block 28 contains and defines a portion 13*a* of the universal supply manifold 13. Likewise, the return manifold block 29 defines a portion 14*a* of the universal return manifold 14. The supply manifold portion 13*a* and the return manifold portion 14*a* are situated as shown in FIG. 1 to eventually be connected to the specific supply and return ports 17 and 18 of the terminal blocks 19 and 20. Of course, where other modules are utilized, each of the modules includes a supply manifold block 28 and a return manifold block 29, each of which defines a respective portion of the supply and return manifolds 13 and 14 in a similar fashion, as does the module 12. Sealing means, such as grooves and O-rings, may be provided on abutting faces of the manifold blocks to prevent leakage along manifolds 13, 14.

Referring again to FIG. 1, it will be appreciated that the basic two-color color changer 11 also includes equivalent structure to the module 12 for each specific color to be applied. That is, for example, the apparatus for selecting color number 1 includes a supply valve 25*a*, a recirculation valve 26*a*, and a return valve 27*a* (not shown), all of which correspond to the supply recirculation and return valves 25–27, respectively, of the module 12. Likewise, the apparatus for selecting paint color number 2 includes a supply valve 25*b*, a recirculation valve 26*b* and a return valve 27*b*, all of which also correspond for example to the supply recirculation and return valves 25–27 of the module 12. Of course, and as noted above, it would be possible to provide each of the apparatus for color number 1 and color number 2 in separate modular form, identical to that of module 12. Nevertheless, it may be more economically advantageous to provide the basic two-color color changer 11 in the form as shown in FIG. 1 as an integral unit, since the basic color changer will be utilized for operations requiring only two colors and one or more identical modules 12 added thereto when additional colors or types of paints are to be utilized in the system.

Figure 5:
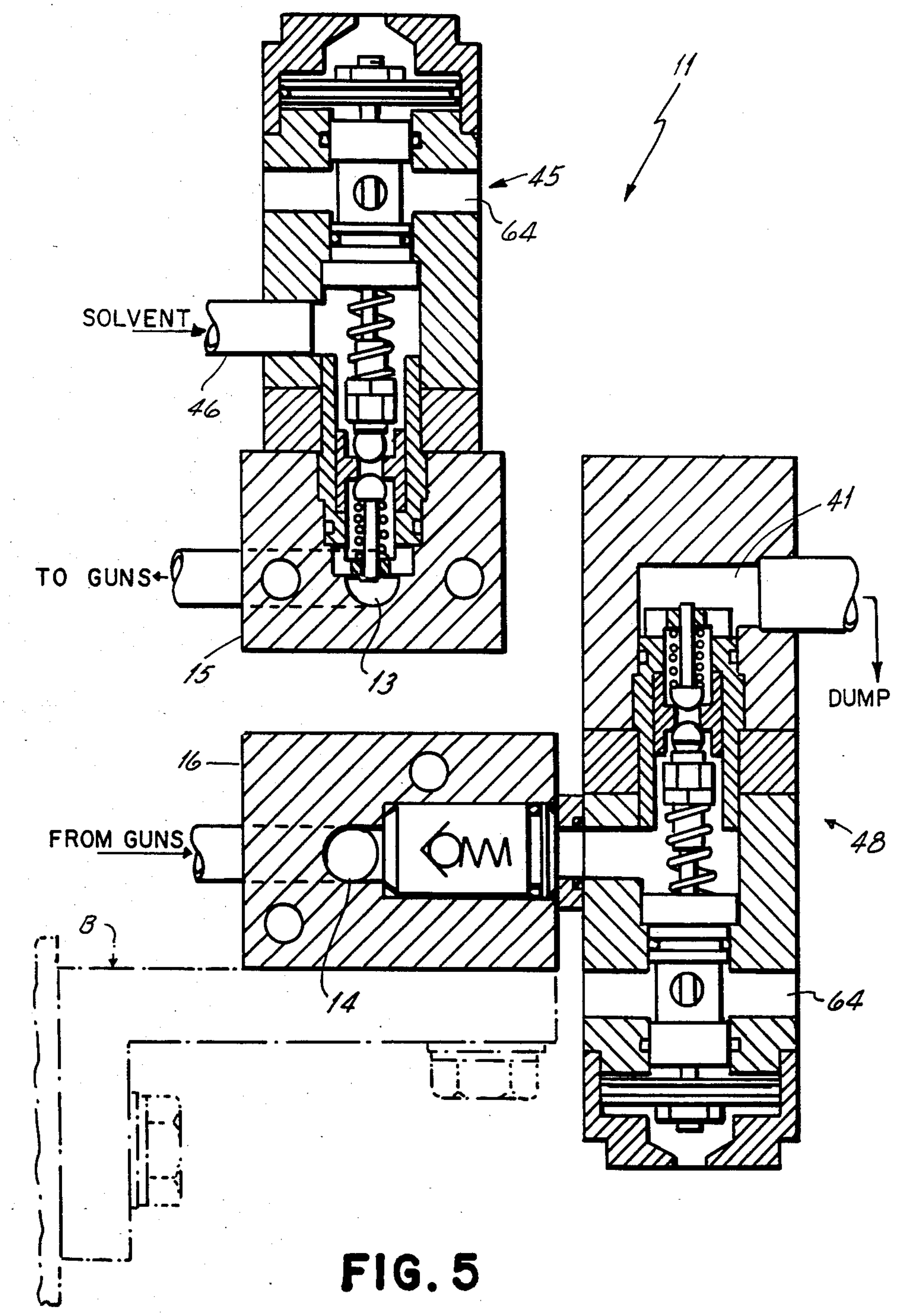
FIG. 5 is a diagrammatic view taken on lines 5—5 of FIG. 1 and similar to FIG. 2, but showing solvent cleaning apparatus.

It will also be appreciated that the basic two-color changer 11 also includes means for cleaning the entire system between changes of color or types of paint. In this regard, a solvent supply valve 45 (FIGS. 1 and 5) is connected to the block 15 and is operatively interconnected with the universal supply manifold 13 upstream of the apparatus for applying colors numbers 1 and 2. Solvent can be supplied to the inlet conduit 46 and, when the solvent valve 45 is opened, solvent is introduced into the universal supply manifold 13 where it can flow out to the guns, back through the return manifold 14 and then can be conveyed to a dump valve (FIG. 5). In this regard, it will be appreciated that the apparatus for introducing solvent for cleaning purposes into the system is somewhat similar to the module 12 with the exception of the lack of any type of recirculation valve, such as the recirculation valve 26 as shown in FIG. 2. Since it is not believed necessary to recirculate solvent when solvent is not being utilized in the system, the solvent valve 45 does not include an outlet port 33, which port is simply closed up, for example, where a similar type of valve is utilized. Also, it will be appreciated that any outlet port from any recirculation block, such as circulation block 30, which might be utilized with the solvent apparatus, is also closed up, except as such port leads to a solvent and waste paint dump.

Accordingly, the solvent supply valve 45 can be opened to admit solvent to the universal supply manifold 13. From there, solvent runs through the conduit to the spraying apparatus, back to the universal return manifold 14 and through a dump valve 48, which is a valve similar to the valve 27 shown in FIG. 2. A diagrammatic illustration of the solvent apparatus is shown in FIG. 5, wherein the dump valve 48 can be opened to pass solvent and waste paint to a waste tank (not shown).

It will be appreciated that the solvent can thus be run through the system from upstream of all colors at an upstream portion of manifold 13, throughout the system to a dump downstream of all return manifolds 14 and return valves 26 for thorough cleaning.

After a solvent application through the respective manifolds 13, 14 and the remainder of the system, it may be advantageous to purge any remaining solvent in the system by blowing pressurized air through the manifolds and other conduits, paint applying apparatus and the like. In this regard, an air supply valve is connected to a source of pressurized air pressure and is mounted on the block 15, being operatively connected also to the universal supply manifold 13 upstream of the solvent supply valve 45. When air supply valve 50 is open, it serves to pass pressurized air through the universal manifolds 13, any intervening conduits, the application apparatus, the return manifolds 14, and through the dump valve or return valve 48 to the dump, thereby purging solvent from the system. Thus, dump valve 48 is also opened during the air purge.

Turning now to the details of the particular color module 12, which are similar to those details for each of the modules or apparatus for applying each of the separate colors or types of paint including that particular apparatus in the two-color changer 11, it will be appreciated that each module or color applying apparatus can be operated independently. The valves are preferably controlled by pneumatically operated pistons which control the various valves 25–27 in each module or changer apparatus in a predetermined manner. Each module is selectively operated in order to select a particular color for application by a paint applying apparatus and at the same time provide recirculation for paint of that color when such paint is not being selected.

Turning now to the details of FIGS. 2–5, it will be appreciated that the particular valves which are utilized in the color changer 10 each constitute a valve of the type referred to by applicant as an A7A valve, which applicant has used in non-circulating dead end color changers.

Each of the valves 25, 26 and 27 are similar. Beginning with supply valve 25, that valve 25 is connected to a paint supply conduit 55, connecting a supply of paint to valve port 56. The supply valve itself includes a valve seat 57 and a reciprocating valve member 58, preferably comprising a ball-like member 58 as shown. Valve member 58 is mounted on a reciprocal stem 59 connected at its upper end to a pneumatically operated piston 60. Stem 59 is provided above the paint inlet chamber 61 with any necessary sealing in order to maintain the paint within the valve body and to prevent it from leaking upwardly. Weep holes 64 prevent any paint which does leak upwardly from entering the air system for the pneumatically operated piston 60. Each of the modules may include air inlet ports, such as ports 62 (see FIG. 1), for supplying pressurized air to expansible chambers 63. It will be appreciated that the respective air inlet ports 62 may be provided with appropriate air fittings for selective connection to a source of selectively controlled pressurized air, or to an exhaust. When it is desired to close the valve 25, air pressure in chamber 63 is exhausted back through inlet port 62 and the valve spring 65 operates to urge the stem 59 and the ball member 58 against the seat 57 to close off the passageway through the seat. It will also be appreciated that supply valve 25 is controlled so as to be a normally closed valve, wherein the valve is normally positioned such as shown in FIG. 3.

In the condition as shown in FIG. 3, any paint admitted through the conduit 55 into chamber 61 is ducted through the bore 32 to the inlet port 34 of the recirculation valve 26, which is a normally closed valve similar to valve 25. Since valve 26 is normally closed, paint moves through that valve 26 into the recirculation block 30, only when the valve 26 is pneumatically opened. When the valve is pneumatically opened, such as when paint of the color associated with this module is not selected, paint moves through the common recirculation chamber 41 and to the paint return through a suitable conduit, such as paint return conduit 67, to the supply of paint of the particular color with which the module is associated.

It will also be appreciated that the return valve 27, as shown in FIG. 3, is also in its normally closed position at this time. This prevents any selected paint of another color, returning in universal conduit 14, from entering the return to the particular non-selected paint color or type controlled by the module of FIG. 3, as will be described. In this regard, it will be appreciated that each of the return manifold blocks 29 also includes a check valve 70, diagrammatically shown in FIGS. 2 and 3, for preventing any portion of the paint between the manifold block 29 and the return valve 27 from returning into the conduit 14. As will be later described, when valve 27 is closed, it traps paint between the seat of valve 27 and the check valve 70. This paint, being noncompressible, serves to hold check valve 70 closed, and thus prevents paint of another color from passing check valve 70 toward valve 27 and paint behind check valve 70 from passing forwardly into manifold 14.

Returning to FIG. 2, it will be appreciated that the supply valve 25 and the return valve 27 are normally closed. When a paint color or type associated with the module of FIG. 2 is selected, these two valves 25, 27 can be opened by the application of pressurized air to the expansible chambers beneath the operative pistons. At the same time, return valve 26 in that module is exhausted through the air inlet 66, thereby permitting the return spring 73 of the valve 26 to close the ball member 74 of valve 26 against its seat 75, preventing any paint in the chamber 76 of the recirculation valve 26 from returning to the common recirculation passageway 41.

In this operation, where paint of the particular module is to be utilized in a paint application procedure, the paint is admitted through the supply valve 25 into the chamber 61 and through the seat 57 to the universal manifold 13, and particularly into the portion 13*a* of the common manifold in the manifold block 28. From there, the paint runs down to or through the manifold 13 wherein it exits at the terminal block 19 through port 17 and goes to the guns or paint applying apparatus, as indicated in FIG. 2.

Of course, it will be appreciated that the outlets and inlets to and from the paint applying apparatus as shown in FIGS. 2 and 3 are diagrammatic only and are shown at a 90° angle with respect to their disposition in FIG. 1 for the purposes of clarity and to illustrate the flow of paint through the module when paint of the color which the module controls is utilized.

From the manifold 13, the paint is circulated to the applicators. Any paint not applied returns through the port 18 to the universal paint return manifold 14. Paint moves along the universal manifold 14 fills up such manifold 14, and opens the check valve 70 in the manifold block 29 of the module which is controlling the paint being used. Paint flows through the check valve 70, through the now opened return valve 27 and past check valve 82 into the recirculation chamber 41 and from there back to the supply of paint for the color being utilized.

It will be appreciated that the flow of paint through return valve 27, as shown in FIG. 2, is a flow of excess paint which is not applied by the applicator. In particular, it will be appreciated that while the applicator is functioning, a certain amount of the paint admitted to the system through the supply valve 25 will actually be applied and will not be returned to the universal return manifold 14. However, some of the paint will be recirculated, in the manner as shown in connection with the description of FIG. 2, back to the paint supply so that paint is not burnt within the system and so that any solids in the paint do not settle out, but remain in suspension. Should the applicators be closed off, for example, then the flow of paint through the module as shown in FIG. 2 becomes somewhat greater, and still constitutes a recirculation of paint throughout the system. It will be appreciated that during this time, all of the other modules are closed by virtue of the normally closed valves 25 and 27 and the paint color being used merely fills up the manifolds 13 and 14, exiting only through the module for the color which has been selected.

It should also be appreciated that while paint pressurizes the check valves 70 in all return manifolds 14, only check valve 70 of the module for the selected paint will open. The other check valves remain closed by the back pressure of their color paint between the check valve and its associated, now-closed, return valve 27.

When it is desired to change to another color or type of paint, the valve 25 and the valve 27 are released and closed, while at the same the recirculation valve 26 is opened, letting the previous color of paint recirculate now only through its module. Thereafter, the solvent supply valve 45 is opened and solvent runs through the supply manifold 13 from upstream of all color modules or apparatus for selecting a color, thereby cleaning out the universal manifold 13 and all downstream conduits and applicators. The solvent is then returned to the return manifold 14 through the port 18 and terminal block 20, and runs through the return manifold 14 to a point downstream of all of the modules or color selecting apparatus to the opened dump valve 48, where the solvent is returned to a waste tank (not shown). Thus, the entire system is cleaned by solvent, with paint of the various colors recirculating through each module and through the valves 25 and 26 thereof. Thereafter, the solvent supply valve is closed and, if desired, the air valve 50 may be opened to dry the entire system by directing air through the entire common supply manifold 13 to the applicator guns and through the return manifold 14 to the dump valve. In this regard, the dump valve 48 is retained open while the air is blown therethrough so that air is exhausted through the dump or waste valve. More typically, the newly selected color would be introduced directly after the solvent flush to push solvent remaining in the system out of the dump valve 48.

It will also be appreciated that each of the valves 25, 26 and 27 in each of the modules contains a check valve, such as the check valve 80, 81 and 82, as shown respectively in valves 25, 26 and 27. These valves prevent any backflow of paint, solvent or the like through the respective valves and yet are easily opened when the valves are opened in order to permit the proper flow of paint therethrough.

It will also be appreciated that each of the valves is constructed and oriented such that the operative flow of paint therethrough is in the same direction as the closing motion of the ball member 58. For example, the operative flow of paint through the seat 57 is in a downward direction, which is the same direction as the ball member 58 would be used to close that valve. The specific check valves 80, 81 and 82 are thus utilized to prevent any back pressure which may occur in the valves from tending to open the main ball members of the valves and thereby prevent any unintentional opening or leakage of paint beyond the valves in an opposite direction of what is intended.

In this regard, it will be noted that check valves 70 and 80 are extremely important to insuring total integrity of the respective paint colors. For example, in a module whose color is not being selected, check valve 80 keeps paint of another color in manifold 13 from opening valve 25 in the non-selected module, and contaminating paint therein. Also, the closing of return valve 27 in a non-selected module traps paint of that module's color between the seat of valve 27 and check valve 70. Since this paint is non-compressible, the trapped paint is useful to hold check valve 70 closed against passage therethrough of any paint of another color, or solvent, from return manifold 14. This contamination of the paint of the non-selected modules is effectively prevented by the respective check valves 70 and 80.

Moreover, it will also be noted that as to paint trapped in the modules between a check valve 70 and return 27, that paint, upon later selection of that module, is first recirculated through valve 27 back to the paint supply and then through the system to the applicators. This insures proper heating of that paint component, and mixing of any solids therein prior to application.

It will also be appreciated that each of the modules is easily stackable or mountable against one another to define, in part, the respective universal supply and return manifolds. This is accomplished by means of appropriate grooves and O-rings in the ports at the edge of the supply and return manifold blocks of the respective modules. It will also be appreciated that the entire changer can be mounted on a bracket, such as bracket B as shown in FIGS. 2 and 5, for mounting on a framework or any appropriate supporting structure.

It will also be appreciated that the respective valves, such as valves 25, 26 and 27, for example, are connected together through appropriate stacking means such as stack screws S in manifold blocks 28 and 29. For example, valves 25 and 26 could be connected together via block 31 and appropriate screws (not shown) extending therethrough. Similarly, the return manifold block 29 is connected to the return valve 27 by the block 36 and by screws (not shown). It will also be appreciated that the respective modules 12 can be connected to the changer 11 and to additional modules by means of stacking screws, such as the screws S as shown in FIG. 1.

Figure 4:
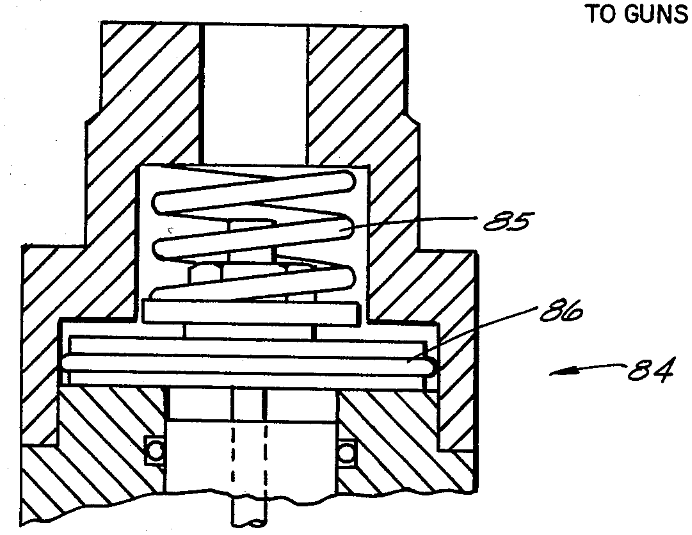
FIG. 4 is a diagrammatic cross-sectional view of a valve actuator of a valve of FIG. 2 showing a helper spring used for high pressure systems.

Turning momentarily now to FIG. 4, there is shown diagrammatically the top area of a valve, such as valve 84, which is similar to the valves 25, 26 and 27. Valve 84 is particularly adapted for utilization in a high pressure, airless paint spraying system, for example. This valve 84 is identical to the valves 25 26 and 27 and a valve 84 is substituted for each of these in each color module for higher pressure application operations. The valve 84 differs only in the addition of the helper spring 85, which is disposed above the piston 86 for supplementing the normal spring (such as spring 65 in FIG. 2) to close the valve. In this regard, it will be appreciated that the high pressure flow of paint through such a valve may, simply by its high pressure, tend to maintain the ball member off the valve seat, even though air pressure is removed from beneath the piston 86. In this regard, the spring 85 may be provided in color changers which are to be utilized with high pressure spraying systems in order to insure that the valves will close when the control air is removed therefrom.

While not heretofore mentioned, it will also be appreciated that each of the valves 25, 26 and 27 includes its own control air inlet port, such as port 62 which was described with respect to the paint supply valve. Such inlet ports, for example, may comprise the inlet port 66 in the paint recirculation valve 26 as shown in FIG. 1, but not shown in FIGS. 2 and 3 for reasons of clarity. Similarly, all of the return valves, such as valve 27, include air inlet ports, such as air inlet ports 68*b* as shown in FIG. 1, with respect to the color changer apparatus for color number 2.

Accordingly, it will be appreciated that the color changer according to the invention is capable of handling numerous different colors which can be selected by the appropriate application of control means to the respective valves of the various color modules, or the valves of the basic two-color changer 11, in order to selectively supply paint of a particular color or type and under high pressures such as 1000 psi or over to an applicator apparatus and recirculating both non-selected paints, and excess selected paint to prevent overheating, the settling of solids, etc.

Accordingly, the invention provides a modular color changer for selectively supplying paint to applicators and recirculating unselected paint constantly to the supply of paints of the non-selected colors. It will also be appreciated that the utilization of identical color modules and their associated component portions of the universal supply and return manifolds makes the addition of numerous colors or types of paint to a basic color changer an easy task to accomplish with minimal additional piping and assembly difficulties while retaining the recirculation capacities for both selected and non-selected paints. The pressure drop across the additional color changers is maintained at a very low level due to the utilization of the respective manifold blocks, and elimination of significant additional piping.

These and other modifications, applications, and advantages will become readily apparent to those of ordinary skill in the art, without departing from the scope of the invention, and applicants intend to be bound only by the claims appended hereto.

We claim:

1. A color changer for selectively controlling introduction of paint in various colors or of various compositions to a paint applicator, said color changer comprising:

a plurality of color module means, each for normally recirculating paint of one color from and to a supply of paint of said one color when said paint of one color is not being applied and for selectively circulating paint of said one color to said applicator with an excess of circulated paint of said one color, not applied by said applicator, recirculating through the module to said supply of paint of said one color;

each color module means operatively engaged with an adjacent color module means to define a universal applicator supply manifold and a universal applicator return manifold, through which paints of all selected colors alternately flow; and each said color module means comprising first, second and third selectively operable valves, a universal applicator supply manifold block and a universal applicator return manifold block, said blocks defining respective paint passages comprising portions of said supply and return manifolds, and said first and third valves being operatively connected to respective ones of said supply and return manifold blocks.

2. A color changer as in claim 1, wherein each said first valve comprises a normally closed paint supply valve operably connected to pass paint of one color from a first supply of paint of said one color to said associated supply manifold block when said first supply valve is opened, and operably connected to said second valve for recirculating paint thereto and to said first paint supply when said first paint supply valve is closed.

3. A color changer as in claim 2, wherein said second valve is a normally closed recirculating valve operably connected to receive paint of said one color from said first valve and to recirculate paint to said first supply when said recirculating valve is opened.

4. A color changer as in claim 3, wherein said third valve is a normally closed return valve operably connected to receive excess paint from said applicator through said return manifold when said first valve is opened and to recirculate excess paint to said first supply when said first valve and said third valve are open at the same time, and wherein said normally closed third valve normally blocks said applicator return manifold from the first paint supply when said first and third valves are normally closed.

5. A color changer as in claim 4, wherein said second and third valves have output ports connected to a common paint recirculation passageway operatively communicating with said first supply.

6. A color changer as in claim 5, wherein each module means includes a recirculation block defining a portion of said paint recirculation passageway, said second and third valves being mounted on said recirculation block and having respective, oppositely disposed, output ports, each in operative communication with said recirculation passageway.

7. A color changer as in claim 5, further including a check valve disposed between said third valve and said universal applicator return manifold for preventing backflow of paint into said return manifold from said recirculation manifold.

8. A color changer as in claim 7, wherein said first, second and third valves each include a valve seat and a positively controlled valve member movable in a first direction toward and against said seat to close said valve.

9. A color changer as in claim 8, wherein each of said first, second and third valves have disposed opposite thereto first, second and third spring biased check valves, respectively, which are movable in a direction opposite to said first direction to prevent backflow of paint opposite to said first direction.

10. A color changer as in claim 4, wherein a check valve is disposed between the return manifold and said third valve to prevent back flow of paint into the return manifold when the third valve is closed.

11. A color changer as in claim 10, wherein when said third valve is closed, the paint trapped between the valve seat of the third valve and the check valve comprises a non-compressible fluid which holds the check valve closed to prevent paint from leaking across the check valve.

12. A color changer as in claim 1, further including a solvent module means operatively connected to and upstream end of an upstream-most paint color module means, said solvent module means comprising a first, normally closed, solvent supply valve for supplying solvent through said universal manifolds, and a normally closed return valve for, when opened, passing solvent from said universal return manifold to a dump.

13. A color changer as in claim 12, and further comprising an air module connected to said solvent module means upstream thereof and having a first, selectively operable, normally closed valve for selectively connecting a source of pressurized air to said universal applicator supply manifold.

14. A color changer for selectively controlling introduction of paint in various colors or of various compositions to a paint applicator, said color changer comprising:

a plurality of supply manifold blocks;

a universal supply manifold defined by a passageway comprising a series of end-to-end connected bores disposed in a plurality of adjacently mounted supply manifold blocks;

a universal return manifold defined by a passageway comprising a series of end-to-end connected bores disposed in a plurality of adjacently mounted return manifold blocks;

one supply manifold block and one return manifold block being provided for each different color of paint;

a supply valve mounted on each supply manifold block and operatively connected to the bore therein for selectively supplying paint of one color thereto;

a return valve mounted on each return manifold block and operatively connected to the bore therein for selectively returning paint from said applicator and said return manifold to a supply of paint of said one color;

a recirculation valve for each color of paint, each recirculation valve operatively connected to a supply valve for recirculating paint of said one color back to a supply of paint of said one color when said color is not supplied to the bore of said respective supply manifold block;

a recirculation block for each different color of paint and defining a recirculation passageway for recirculating paint to said supply of paint of said one color;

said recirculation valve and said return valve each mounted to said recirculation block, and operatively connected to said recirculation passageway;

a respective supply manifold block, return manifold block, recirculating manifold block and the valves respectively connected thereto comprising a single color module means; and means for operatively connecting together the respective supply manifold blocks and the respective return manifold blocks to form said universal manifolds and to operatively join said single color module means together for selectively providing and receiving respective paints of various colors to and from said universal manifolds.

15. A color changer as in claim 14, further including:

a solvent block defining a bore connected to said other bores in said supply manifold blocks and comprising an upstream portion of said supply manifold;

a solvent valve for selectively passing solvent throughout said supply and return manifolds for the clearing thereof prior to a color change;

a solvent and waste paint return manifold block defining a bore connected to said other bores in said return manifold blocks comprising a downstream portion of said universal return manifold;

a dump block;

a dump valve mounted on said dump block for selectively dumping solvent and waste paint from said universal supply and return manifolds downstream of all said return manifold blocks of said color module means; and said solvent and waste paint return manifold block, solvent valve, dump block and said dump valve comprising a solvent and waste paint module means for cleaning said universal manifolds through their lengths prior to a color change.

16. A color changer as in claim 15, further comprising:

a pressurized air block defining a bore connected to said other bores in said supply manifold blocks through the bore on said solvent block;

a pressurized air valve for selectively passing pressurized air through said supply and return manifolds; and said pressurized air block and air valve comprising an air module means for purging said universal supply and return manifolds from upstream of to downstream of said solvent and waste paint module means.

17. A recirculating color changer for selectively controlling introduction of paint from respective supplies of paint of various colors to a paint application and for recirculating paint to a respective paint supply, said color changer comprising:

a plurality of color module means, each for selectively directing paint of one color from a first paint color supply to said application and for returning paint of said one color from said first supply to said first supply when said color is not selected and for returning excess paint of said color to said first supply during painting with said color;

each said module means defining a respective portion of a universal applicator paint supply manifold, means for conveying paint of a selected color to said applicator, and a universal applicator paint return manifold for returning excess paint of a selected color from said applicator to a paint supply for paint of said selected color.

18. A color changer as in claim 17 in combination with a plurality of supplies of paint pressurized in excess of 1000 psi.

19. A color changer for selectively controlling introduction of paint in various colors to a paint applicator apparatus, said color changer comprising:

a universal applicator supply manifold;

a universal applicator return manifold;

a plurality of stackable color changer module means for alternatively supplying paint in respective colors to said universal supply manifold, and for alternatively receiving paint in respective colors from said universal applicator return manifold, said module means defining respective portions of said supply and return manifolds; and each of said stackable color changer module means further comprising a normally closed supply valve, a normally closed recirculating valve, and a normally closed return valve;

said supply valve operatively connected to said recirculating valve and normally passing paint from one color supply thereto when closed, said recirculating return valve passing said one color back to the same color supply through a recirculation passageway; and said return valve connected between said universal applicator return manifold and said recirculation passageway, and operable to pass paint of said one color to said same color supply through said recirculated passageway when said supply valve is opened, said recirculation valve is closed and said return valve is opened.

20. A color changer for selectively controlling introduction of paint in various colors to a paint applicator, said color changer comprising:

at least a first paint supply valve means, at least a first recirculating valve means and at least a first return valve means for each color of paint to be selected;

an applicator supply manifold block defining a supply manifold;

an applicator return manifold block defining a return manifold;

said supply valve means operatively connected to said supply manifold block for selectively opening to flow paint of one color thereto;

said return valve means operatively connected to said return manifold block for selectively opening to flow paint of said one color to a supply of paint of said one color from said return manifold; and said recirculation valve means for selectively recirculating paint of said one color from said supply valve means to said paint supply when said one color is not selected and said supply and return valve means are closed.

21. A color changer as in claim 20, further including a check valve means operatively disposed between said supply manifold and said supply valve means for preventing flow of paint from said supply manifold past said check valve means, toward said supply valve means.

22. A color changer as in claim 20, further including a check valve means operatively disposed between said return manifold and said return valve means for passing paint from said return manifold to said return valve means when said return valve is opened, and for trapping paint between itself and said return valve means when said return valve is closed to prevent paint in said return manifold from passing said check valve means when said return valve is closed.

23. A color changer as in claim 20, wherein said paint supply valve means is normally a spring closed, pneumatically opened valve having a seat, a sealing member movable against said seat to close said supply valve means, and a pneumatic piston connected to said sealing member for selectively moving said sealing member away from said seat upon the application of air pressure thereto, and further including an additional spring means for supplementing the closing force of said sealing member toward said seat.

* * * * *